United States Patent [19]
Higurashi

[11] Patent Number: 5,822,140
[45] Date of Patent: Oct. 13, 1998

[54] DIGITAL ADDRESS INFORMATION RECORDING METHOD FOR RECORDING ABSOLUTE ADDRESS TOGETHER WITH INFORMATION SIGNAL ON RECORDING MEDIUM

[75] Inventor: Seiji Higurashi, Fuchu, Japan

[73] Assignee: Victor Company of Japan, Ltd., Yokohama, Japan

[21] Appl. No.: 739,555

[22] Filed: Oct. 30, 1996

[30] Foreign Application Priority Data

Oct. 31, 1995 [JP] Japan .................................. 7-283439

[51] Int. Cl.$^6$ .............................. G11B 5/09; G11B 15/18
[52] U.S. Cl. .............................................. 360/49; 360/722
[58] Field of Search .................... 360/49, 72.1, 72.2, 360/74.4, 74.1, 27, 69; 386/4, 6, 68, 69, 52

[56] References Cited

U.S. PATENT DOCUMENTS

| | | | |
|---|---|---|---|
| 4,639,792 | 1/1987 | Moxon | 360/49 |
| 5,392,167 | 2/1995 | Adachi | 360/72.1 |
| 5,410,308 | 4/1995 | Keesen et al. | 341/60 |

FOREIGN PATENT DOCUMENTS

| | | |
|---|---|---|
| 62 293 568 | 12/1987 | European Pat. Off. . |
| 0 316 184 | 5/1989 | European Pat. Off. . |
| 0 603 808 | 6/1994 | European Pat. Off. . |
| 0 646 914 | 4/1995 | European Pat. Off. . |
| 0 723 267 | 7/1996 | European Pat. Off. . |

OTHER PUBLICATIONS

AR—Committee Draft Document of IEC 1834–2: Helical–scan Digital Video Cassette Recording System . . . , pp. 36, 37 and 95 (1996, Mar.).

*Primary Examiner*—Aristotelis M. Psitos
*Assistant Examiner*—Regina Y. Neal
*Attorney, Agent, or Firm*—Michael N. Meller

[57] ABSTRACT

A method of recording an information signal on a recording medium. The method includes recording of first flag indicating an absolute address being continuous without overlapping, second flag indicating the absolute address having a probability of discontinuity without overlapping, third flag indicating the absolute address having a probability of overlapping, and fourth flag indicating the absolute address being absent. And one of the first through fourth flags is recorded with the absolute address.

5 Claims, 5 Drawing Sheets

| SB # | ID0 | | | | | | | | ID1 | | | | | | | |
|---|---|---|---|---|---|---|---|---|---|---|---|---|---|---|---|---|
| | bit7 | bit6 | bit5 | bit4 | bit3 | bit2 | bit1 | bit0 | bit7 | bit6 | bit5 | bit4 | bit3 | bit2 | bit1 | bit0 |
| 4n | | | | | | | | | | Tag | | | Synch. Block No. | | | |
| 4n+1 | SF | | | Track Number | | | | | | Tag | | | Synch. Block No. | | | |
| 4n+2 | | | | Track Number | | | | | | Tag | | | Synch. Block No. | | | |
| 4n+3 | | | | Track Number | | | | | | Tag | | | Synch. Block No. | | | |

*Fig. 7*

DIGITAL ADDRESS INFORMATION RECORDING METHOD FOR RECORDING ABSOLUTE ADDRESS TOGETHER WITH INFORMATION SIGNAL ON RECORDING MEDIUM

BACKGROUND OF THE INVENTION

1. Field of the Invention

The present invention relates to an information signal recording method and, particularly, to an information recording method which records an absolute track number with an information signal on a tape recording medium.

2. Description of the Related Art

It has been known that a magnetic recording/reproducing apparatus which performs a recording/reproducing operation in a form of analogue or digital information signal of a sound or video signal by helically scanning a magnetic tape with rotary magnetic heads.

In such a magnetic recording/reproducing apparatus, an absolute address is recorded on a oblique track on a magnetic tape or on a track extending along a longitudinal direction of the magnetic tape for detecting a position on the magnetic tape, such as for searching a start position of information or for automatic electronic editing. The absolute address is often represented by a time code which defines an address based on a television frame as a minimum unit, in second, minute, and hour, and 24 hours as a maximum value, or represented by a track number showing an order of the oblique tracks.

For example, in a digital recording/reproducing apparatus with rotary magnetic heads, such as a digital audio tape recorder (DAT), digital data (main data such as program data), the above track number and an ID signal to indicate authenticity of the track number are recorded on every track in a form of predetermined data blocks.

Thus, the track number is correctly recorded when the information data are recorded continuously from the beginning of a tape. On the other hand, the recorded track number becomes unreliable when the recording of information data is interrupted and resumed with another information data, because the track numbers to be given to the resumed recording are estimated by calculating the residual amount of the tape considering such as the diameter and the rotational speed of the capstan and the rotational speeds of the tape supply reel and the take-up reel of the digital recording/reproducing apparatus.

However, the above-mentioned conventional track number recording method has a disadvantage as follows. In the conventional track number recording method, the identification signal is 1 bit, and can show only 2 statuses that the track number is correct or not. As explained before, it is highly possible that the beginning track number of the resumed recording of information data overlaps with the last track number of the previously recorded information data, or becomes discontinuous from the last track number of previously recorded information data.

This overlapped or discontinuous track number is not reliable for the search of start position and the automatic electronic editing.

SUMMARY OF THE INVENTION

Accordingly, it is a general object of the present invention to provide an accurate method for recording absolute address in a format of track numbers on a recording medium at any recording conditions.

A feature of the present invention is that an absolute track numbers are recorded on a recording medium with a flag which shows one of the following first through fourth values:

first flag value showing that track numbers are continuous without overlapping, second flag value showing that track numbers are not overlapping but the beginning track number of a succeeding program is possible to be discontinuous from the last track number of a preceding program, third flag value showing that the beginning track number of a succeeding program is possible to be overlapped with the last track number of the preceding program, and fourth flag showing no recording of the track numbers.

As explained the above, the status of a track number can be known by the flag value because the flag tells the corresponding statuses of the recorded track numbers.

In the present invention, a recording media is a tape, on which the first program recording is initiated with a recording of absolute track numbers and the first flag value, and the residual tape amount is estimated by calculation at every subsequent recording of another program. Thereupon, the absolute track number is determined from the estimated residual amount of the tape, and recorded on the tape. And in the subsequent second program recording, the third flag value is recorded together in the period determined from the maximum error of estimating the residual tape amount, thereafter, the second flag value is recorded up to the end of the second program recording. After the end of the second program recording, the fourth flag value is recorded.

On the tape as recorded above, a presence of the first or the second flag tells that the absolute track numbers are not overlapped, therefore, reliable track numbers are available in the reproduction of the tape on which a plurality of programs are recorded apart.

BRIEF DESCRIPTION OF THE DRAWINGS

FIG. 7 shows contents of ID0 (first identification) and ID1 (second identification) shown in FIG. 6.

DETAILED DESCRIPTION OF THE PREFERRED EMBODIMENT

The present invention will now be described in detail with reference to the accompanying drawings.

Figure 1:
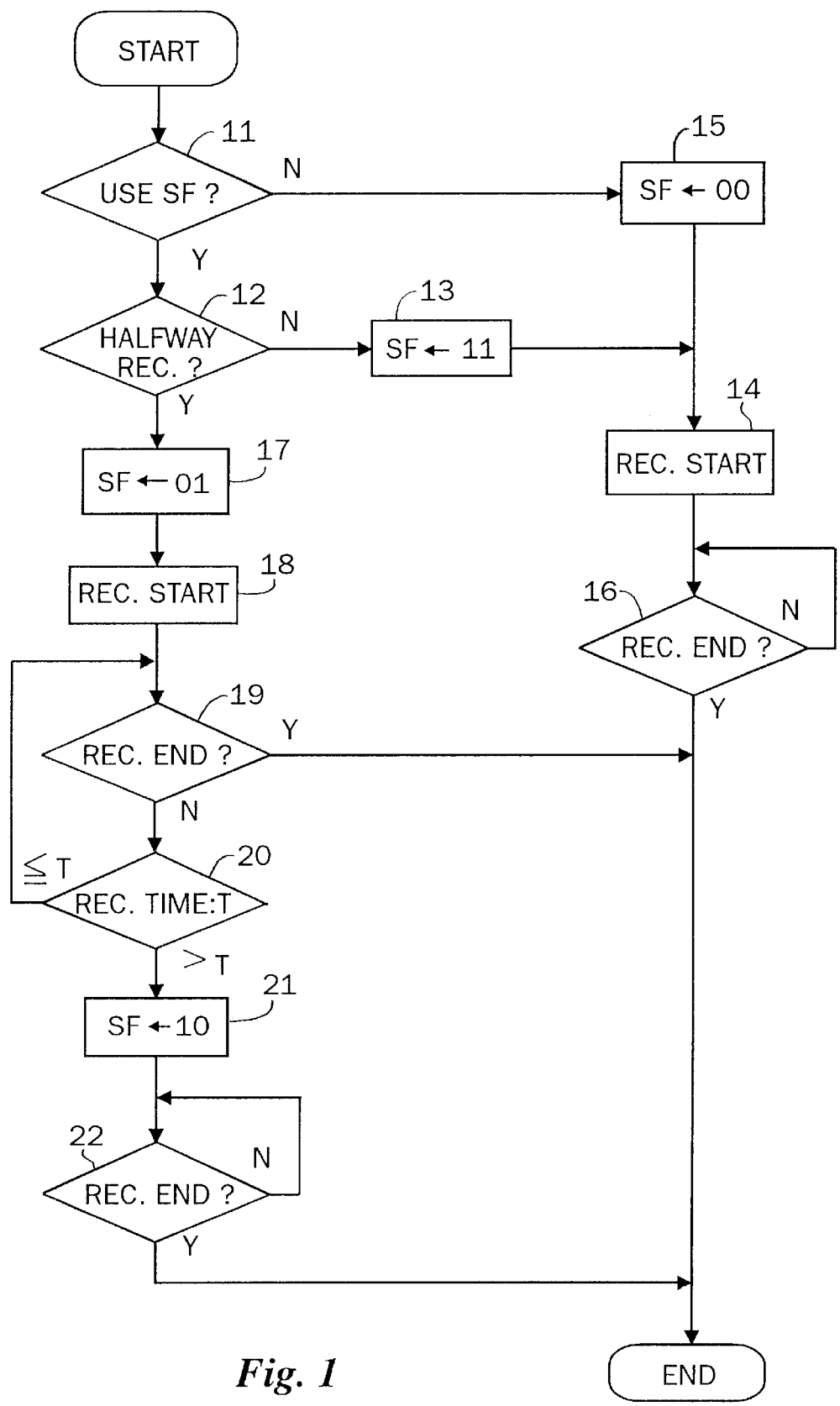
FIG. 1 is a flowchart showing an embodiment of an address information recording method of the present invention.

FIG. 1 is a flowchart showing an embodiment of an address information recording method of the present invention.

Figure 2:
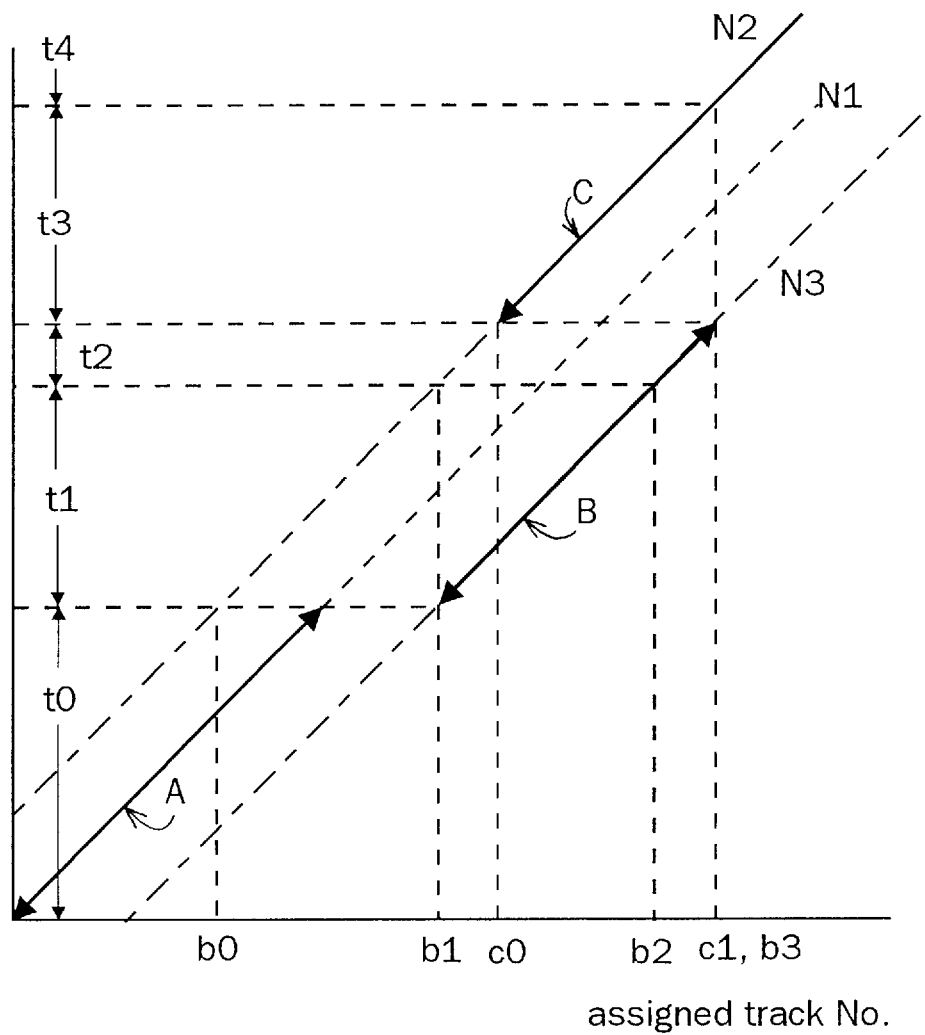
FIG. 2 is a time chart showing a relationship between ideal track numbers and real track numbers.

FIG. 2 is a timechart showing a relationship between ideal track numbers and real track numbers.

A real track number is recorded on a recording medium as an absolute track number.

In this embodiment, a helical scanning type video tape recorder (VTR) is assumed to be used to record digital signals, track numbers, and support flags for identifying the track numbers on a tape. The helical scanning type VTR has two rotary heads provided, on a rotary drum, at 180 degrees apart, and having different azimuth angles each other. The tape is wrapped around the drum, and is in contact with the drum for a little more than 180 degrees. The support flags (to be explained later) are recorded with the track numbers.

Figure 3:
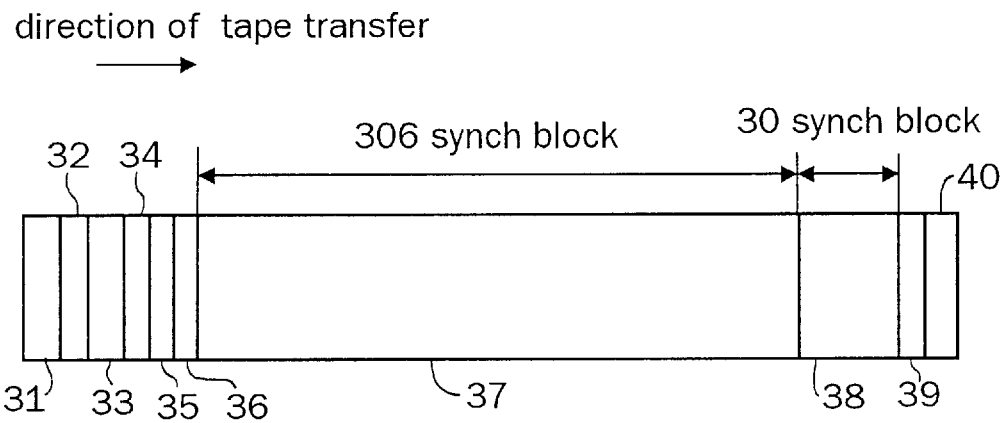
FIG. 3 shows a exemplary track format of the present invention.

FIG. 3 shows an exemplary track format of the present invention.

On each track, data areas are provided to contain a predetermined amount of the data blocks called sync blocks along a scanning direction of the rotary heads. As shown in FIG. 3, digital data are recorded on one track in a form of time sequentially arranged multiple data blocks (sync blocks).

In FIG. 3, a track is comprised of a margin area 31, a preamble area 32, a subcode area 33, a postamble area 34, an interblock gap (IBG) area 35, a preamble area 36, a data area 37, an error correction code area 38, a postamble area 39, and a margin area 40. A main data area is comprised of the data area 37 and the error correction code area 38. The data area 37 is an area where 306 sync blocks of digital signals DATA1 are recorded. The digital signals DATA1 are normal reproduction data or special reproduction data. The error correction code area 38 is an area where 30 sync blocks of outer code (C3 code) are recorded.

Figure 4A:
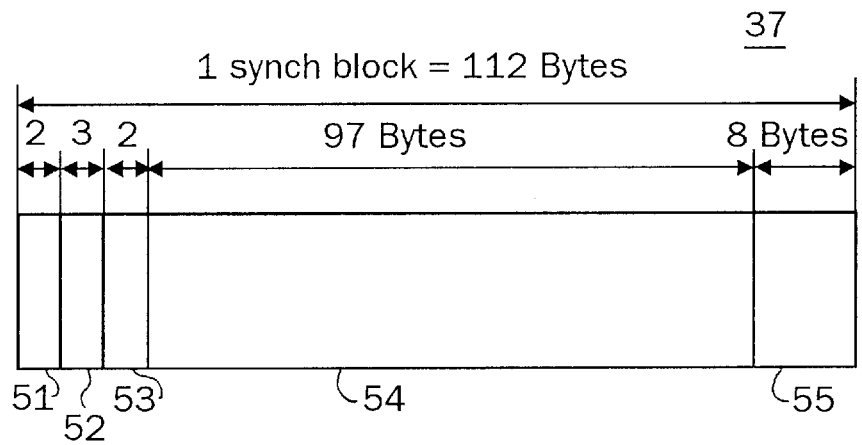
FIGS. 4(A) and 4(B) respectively show formats of main code area and of subcode area.
Figure 4B:
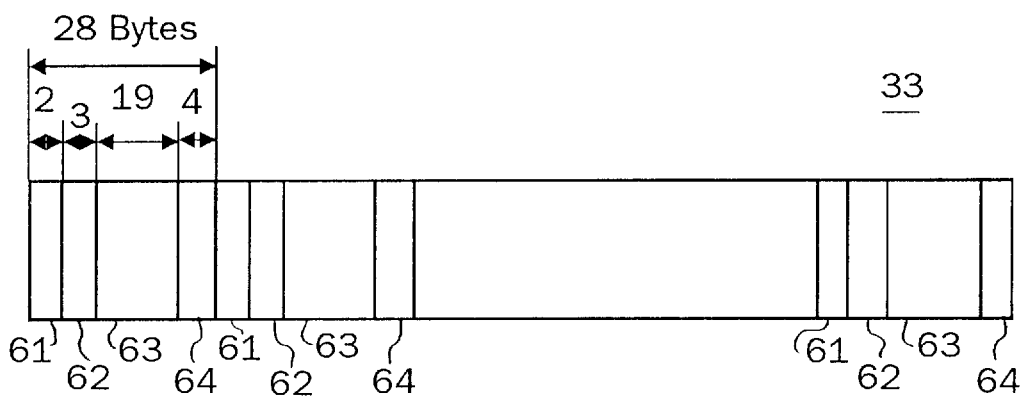

FIGS. 4(A) and 4(B) respectively show formats of main code area and of subcode area.

FIG. 4(A) shows a sync block format of the data area 37, where the main data are stored. FIG. 4(B) shows a format of the subcode area 33.

As shown in FIG. 4(A), in the main data area 37, one sync block of 112 bytes are time sequentially comprised of 2 bytes of sync area 51, 3 bytes of address information (ID) area 52, main header (MH) area 53 for recording the format information, 97 bytes of data storage area 54 for storing various kinds of information, and 8 bytes of parity area 55 for error correction of the sync block 37.

As shown in FIG. 4(B), the subcode area 33 typically contains 16 units of 28-bytes blocks time sequentially, each of the 28-bytes blocks is comprised of 2 bytes of sync area 61, 3 bytes of ID area 62, 19 bytes of data area 63, and 4 bytes of parity area 64. Accordingly, the subcode area 33 contains 448 bytes (16×28). These 16 blocks are independent each other. The data of the subcode represent information attributed to the main data in the data area 37, such as a format information, contents, and the recorded date of the main data.

Figure 5:
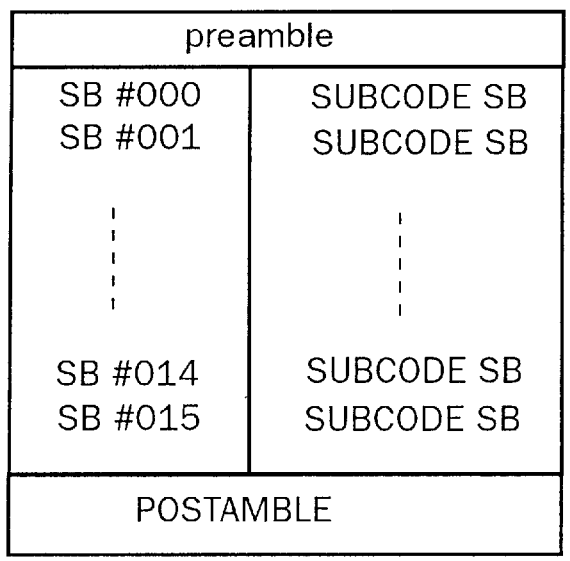
FIG. 5 shows a structure of subcode area.

FIG. 5 shows a structure of subcode area.

Figure 6:
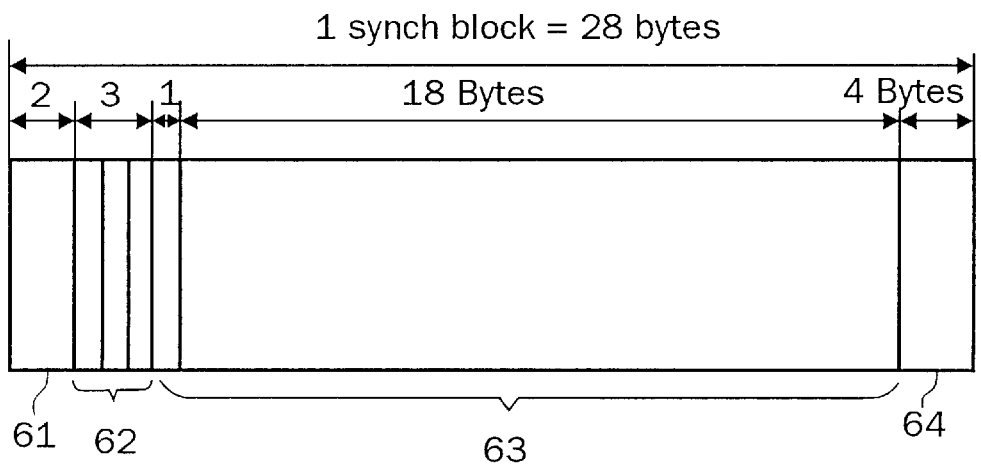
FIG. 6 shows a detailed structure of one synchronous block in the subcode area.

FIG. 6 shows a detailed structure of one synchronous block in the subcode area.

FIG. 5 shows details of the subcode 33. The subcode 33 has 16 sync blocks. FIG. 6 shows the format of one of the sync blocks. The format shown in FIG. 6 is the same to that shown in FIG. 4(B). The data area 63 in FIG. 4(B) is, practically, comprised of 18 bytes of subcode data (3 packets of 6-byte data), and 1 byte subcode header.

FIG. 6 shows a detailed structure of a synchronous block of subcode.

As shown in FIG. 6, the ID area 62 (shown in FIG. 4(B)) is comprised of 1 byte of first address ID0, 1 byte of second address ID1, and 1 byte of ID parity IDP for detecting errors of the first and second address ID0, ID1. It is a feature that 2 bits of start flag SF is set in the first address ID0.

FIG. 7 shows details of ID0 (first address) and ID1 (second address) shown in FIG. 6.

As shown in FIG. 7, every component of the first address ID0 and the second address ID1 are set corresponding to the sync block number SB# in the subcode area 63. Further, a support flag SF indicating a status of track number is set to upper 2 bits of the first address ID0 of the (4n+1)th sync block.

Following to the SF, an upper byte of the absolute track number is set in the lower-order 6 bits of the (4n+1)th sync block of the first address ID0. Similarly a middle byte of the same absolute track number is set in the (4n+2)th sync block of the first address ID0 and a lower byte of the same absolute track number is set in the (4n+3)th sync block of the first address ID0. Accordingly, one absolute track number (ATNO) is represented by 22 bits.

Tags respectively assigned to 4 groups of upper 4 bits of ID1, are a start flag, an index flag, a skip flag, a marker flag respectively, but their explanations are omitted because they do not directly relate to the present invention.

The support flag SF will be explained below.

The support flag SF is set to "00" when the track number is not recorded. The support flag SF is set to "01" when the track number is possible to be overlapped with that of the previously recorded program. The support flag SF is set to "10" when the track number is not overlapped but possibly discontinuous with that of the previously recorded program. The support flag SF is set to "11" when the track number is continuously set with that of the previously recorded program without overlapping.

Now, an operation of the embodiment of the present invention will be described with reference to the flowchart of FIG. 1.

As shown in FIG. 1, whether the support flag is recorded together with a track number as an absolute address, or not is determined at the operator's option (step 11). If "YES", the status of the support flag is determined by examining whether the recording of information signals is started from a halfway point of the tape, or the beginning of the tape, that is, by examining the transparent leader tape being detected or not (step 12). The support flag SF is set to "11" when the recording of the information signals is determined to be started from the beginning of the tape (step 13), then the recording is started (step 14). The support flag is set "00" when the support flag is not used or the track number is not recorded (step 15), and the recording of the information signal is started (step 14). Then the value of the support flag SF is kept the same from the beginning to the end of the recording of the information signal.

The support flag is set to "01" (step 17) when the recording of the information signals is started from a halfway point of the tape which is determined in the step 12. Then the recording is started (step 18). Thereafter, it is determined whether the recording of the information signal is terminated or not (step 19). When the recording is still continued (N), an elapsed recording time is examined (step 20). When the elapsed recording time is equal to or smaller than a predetermined value T, the support flag SF is kept "01" until the recording time reaches to the predetermined value T. The support flag SF is changed to "10" (step 21) when the elapsed recording time is examined to be larger than the predetermined value T in step 20. The support flag SF keeps the value "10" until the end of the recording.

The recordings of the support flag SF and the track numbers will be described with reference to FIG. 2.

FIG. 2 shows that a program A is recorded for a period of $t_0$ from the beginning of the tape, subsequently, a program B is recorded for a period of $t_1+t_2$, and then a program C is recorded.

The program A is recorded from the beginning of the tape and the track numbers are recorded together continuously. Thus, the track numbers representative of the absolute addresses, and the support flags being 11 are recorded in the sub code area of the tape. Progress of this recording of the program A is indicated by a line N1 in FIG. 2.

Along the line N1, an actually recorded track numbers accord with an ideal track numbers as no overlapping and discontinuity of track numbers occurs. Recording of the program B is started at the halfway point of the tape without knowing how program A is previously recorded. In this case, the track numbers to be recorded for the program B are determined by estimation based on the residual amount of the tape as explained before. For this estimation, a known method can be used. Thus estimated value of the track numbers are anticipated to have an error. Maximum value of this error is known from experience and is shown in FIG. 2 as a distance from the line N1, which will be explained hereafter. If the residual amount of the tape is estimated more than its true value (N1), the beginning track number will overlap with the last track number of the program A. Progress of this subsequent recording having the negative maximum error is shown as a line N2 in FIG. 2. If the residual amount of the tape is estimated less than its true value, the beginning track number of the program B will be discontinuous from the last track number of the program A. This relationship where the positive maximum error develops is shown as a line N3 in FIG. 2. As far as assigned track numbers are concerned, recording of the program B is possible to start within a range between points $b_0$ and $b_1$. If the recording is made along the line N2, an overlap of the track number occurs at least in a period of $t_1$, thus in the period $t_1$, the support flag "01" is given. And thereafter, "10" is given for a period of $t_2$ as there is no possibility of track overlapping.

On the other hand, when the recording of the program B is made along the line N3, having a positive maximum error, and recording of the program C is made along the line N2 (negative maximum error), the maximum overlapping range of the two track numbers will be two times the maximum error value (the positive maximum to the negative maximum). This maximum overlapping range is defined as the predetermined recording time T.

FIG. 2 shows that the track number of the program B begins with $b_1$, and ends with $b_3$. And recording of the program C starts with $c_0$, and after a time period of $t_3$, the track number reaches $c_1$ ($b_3$).

Thus, the track number overlapping is developed between the progress B and C of their given track numbers from $c_0$ to $c_1$. Since a time difference corresponding to this track number overlapping is a vertical (time scale) distance between the lines N2 and N3, a period $t_3$ is equivalent to the predetermined recording time T, and during this period, the support flag SF of "01" is given to the program C for indicating a probability of overlapping of the track numbers between the programs B and C. Then the support flag SF is set to "10" from $c_1$ to the end of the recording of the program C showing a probability of no overlapping and of discontinuity of the track numbers between the program B and C.

The identification signal of the conventional method uses 1 bit, and shows only 2 statuses that the track number is correct or not. As explained before, it is highly possible that the beginning track number of the discontinuously recorded information data overlap with the last track number of the previously recorded information data, or is discontinuously numbered with the last track number of the previously recorded information data.

This overlapped or discontinuous track number is unusable for the start position search and the automatic electronic editing.

In the present invention, the support flag SF utilizes 2 bits. When the support flag SF is set to "11" or "10", it means that the track numbers are not overlapped. Track numbers with this flag are available for the start position search and the automatic electronic editing.

FIG. 2 shows the case that the programs A, B, C are recorded successively. In this case, if the tape is tentatively rewound to read the last track number of the program previously recorded if any, the track numbers of the program subsequently recorded can be recorded continuously from the above last track number.

As shown in this embodiment of the present invention, setting of the support flag SF to "01" is safe in the cases when continuity of track numbers between two successive programs is uncertain or the formerly recorded program may not have track numbers.

The present invention can be applied to an analogue signal recording system. In this case, the track numbers and the support flags can be multiplexed and recorded on a specific region of the vertical blanking period, or recorded along the edge of the tape forming an additional track.

Moreover, the present invention can be applied to the apparatus for recording time codes.

As explained before, it is an advantage of the present invention that the flags make it possible for the track numbers to be identified being overlapped or discontinued. On the other hand, discontinued track numbers can not be detected by a 1-bit flag system of the prior art.

It is another advantage of the present invention that an area where start position search can be done is wider than that of conventional method.

It is still another advantage of the present invention that start position search and reproduction is performed more accurately on a recorded tape having a blank period between the recorded programs than by the conventional method because reliable track numbers can be obtained owing to the flags.

What is claimed is:

1. A method of recording a series of information signals and recording optionally an absolute address on a recording medium, said absolute address indicating a recorded position of said information signals on said recording medium, said method comprising the steps of:

selecting one flag from among a group of first through fourth flags which respectively indicate a degree of reliability of said absolute address, corresponding to a recording state of said absolute address, wherein said first flag indicates that said absolute address is continuous without overlapping between said information signals, said second flag indicates that said absolute address has a possibility of discontinuity without overlapping between said information signals, said third flag indicates that said absolute address has a possibility of overlapping between said information signals, said fourth flag indicates that said absolute address is absent, and recording of said one flag selected among said first through fourth flags together with said absolute address on said recording medium.

2. A method as claimed in claim 1, wherein said recording medium is a tape, and said information signals comprises first and second programs, said second program is recorded subsequent to recording of said first program, a residual amount of said tape is estimated upon recording of said second program, said absolute address recorded with said second program is determined by estimating said residual amount of said tape and is recorded on said tape, a predetermined time is determined by estimating said residual amount of said tape, and when an elapsed recording time of said second program is within said predetermined time, said third flag is recorded, and after said elapsed recording time exceeds said predetermined time, said second flag is recorded.

3. A method as claimed in claim 2, wherein said absolute address is one of a track number and a time code.

4. A method as claimed in claim 1, wherein said absolute address is one of a track number and a time code.

5. A method of recording series of information signals and recording optionally an absolute address on a recording medium, said absolute address indicating a recorded position of said information signals on said recording medium, said method comprising the steps of:

selecting one flag from among a group of first through fourth flags which respectively indicate a degree of reliability of said absolute address and have more than 1 bit, corresponding to a recording state of said absolute address, wherein said first flag indicates that said absolute address is continuous without overlapping between said information signals, said second flag indicates that said absolute address has a possibility of discontinuity without overlapping between said information signals, said third flag indicates that said absolute address has a possibility of overlapping between said information signals, and said fourth flag indicates that said absolute address is absent, and recording of said one flag selected among said first through fourth flag, together with said absolute address on said recording medium.

* * * * *